(12) United States Patent
Jensen et al.

(10) Patent No.: US 12,209,387 B2
(45) Date of Patent: Jan. 28, 2025

(54) REMOTE CONTROL OPERATION OF A MACHINE USING A LIGHT BEAM FOR DEPTH PERCEPTION

(71) Applicant: Caterpillar Inc., Peoria, IL (US)

(72) Inventors: Cameron Jensen, Shorewood, IL (US); Victor A. Simkus, Elgin, IL (US)

(73) Assignee: Caterpillar Inc., Peoria, IL (US)

( * ) Notice: Subject to any disclaimer, the term of this patent is extended or adjusted under 35 U.S.C. 154(b) by 406 days.

(21) Appl. No.: 17/652,845

(22) Filed: Feb. 28, 2022

(65) Prior Publication Data
US 2023/0272595 A1  Aug. 31, 2023

(51) Int. Cl.
| | |
|---|---|
| *G01C 3/10* | (2006.01) |
| *E02F 9/20* | (2006.01) |
| *G05D 1/00* | (2006.01) |
| *H04N 7/18* | (2006.01) |

(52) U.S. Cl.
CPC ........... *E02F 9/205* (2013.01); *G01C 3/10* (2013.01); *G05D 1/0022* (2013.01); *G05D 1/0038* (2013.01); *H04N 7/183* (2013.01)

(58) Field of Classification Search
None
See application file for complete search history.

(56) References Cited

U.S. PATENT DOCUMENTS

| | | | |
|---|---|---|---|
| 8,473,143 | B2 | 6/2013 | Stark et al. |
| 9,374,562 | B2 * | 6/2016 | Trombley ............ B62D 53/045 |
| 10,452,353 | B2 | 10/2019 | Anderson |
| 10,698,114 | B2 | 6/2020 | Keilaf et al. |
| 10,852,438 | B2 | 12/2020 | Hartman et al. |
| 11,036,230 | B1 | 6/2021 | Ebrahimi Afrouzi |
| 2002/0046479 | A1 * | 4/2002 | Rogers ............... G01C 3/10 42/114 |
| 2004/0061848 | A1 * | 4/2004 | Kanemitsu ............ G01C 3/10 356/3.01 |
| 2006/0255560 | A1 * | 11/2006 | Dietz ............... B60D 1/36 280/477 |

(Continued)

FOREIGN PATENT DOCUMENTS

JP   H11293711 A   10/1999

OTHER PUBLICATIONS

UK Search Report for UK Patent Appln. No.GB2301664.5, mailed Jul. 20, 2023 (3 pgs).

*Primary Examiner* — Peter D Nolan
*Assistant Examiner* — Jacob Kent Besteman-Street

(57) ABSTRACT

A system may include a light source configured to emit a light beam. The system may further include a camera configured to obtain image data of an environment that includes the light beam and a target object. The system may further include a wireless communication component configured to provide the image data to a remote control device that controls an operation of a machine. The image data may be provided to cause the image data to be included in a video feed, of the environment, displayed by the remote control device, The light source may be configured to cause the light beam, in the video feed, to provide a visual indication of a distance from the machine to the target object. Control of the operation of the machine, through the remote control device, is based, at least in part, on the light beam displayed in the video feed.

20 Claims, 6 Drawing Sheets

(56) References Cited

U.S. PATENT DOCUMENTS

| | | | |
|---|---|---|---|
| 2011/0216199 A1* | 9/2011 | Trevino | H04N 7/183 |
| | | | 348/148 |
| 2011/0317146 A1* | 12/2011 | Gu | G01C 3/10 |
| | | | 356/4.03 |
| 2015/0094953 A1 | 4/2015 | Montgomery | |
| 2015/0260845 A1* | 9/2015 | Takemura | G01S 7/4815 |
| | | | 356/3.11 |
| 2020/0199853 A1* | 6/2020 | Konda | E02F 9/265 |
| 2021/0239808 A1 | 8/2021 | Friend | |
| 2021/0306621 A1* | 9/2021 | Ma | H04N 23/60 |
| 2024/0125097 A1* | 4/2024 | Buda | G01C 21/3848 |

* cited by examiner

REMOTE CONTROL OPERATION OF A MACHINE USING A LIGHT BEAM FOR DEPTH PERCEPTION

TECHNICAL FIELD

The present disclosure relates generally to a remote control operation of a machine and, for example, to a remote control operation using a light beam for depth perception.

BACKGROUND

A machine can be controlled using a remote control device. The remote control device may operate the construction machine without line-of-sight with respect to the machine. Accordingly, the machine may include sensor devices that generate sensor data that provides a measure of depth perception (or perception of depth) with respect to an environment surrounding the machine. The remote control device may use the sensor data to control the machine based on the depth perception provided by the sensor data.

In some instances, the environment may be subject to harsh environmental conditions. In this regard, the harsh environmental conditions may cause the sensor devices to prematurely experience a failure. As a result of the sensor devices prematurely experiencing a failure, the machine may be operated, by the remote control device, remotely without line-of-sight and without depth perception.

Operating the machine without line-of-sight and without depth perception causes the machine to operate inefficiently (e.g., inefficient use of components such as an engine, an implement, among other examples), may cause damage to the machine (e.g., due to unascertained conditions of the environment and/or a terrain in the environment), may cause a task to be performed incorrectly by the machine, among other examples.

The system of the present disclosure solves one or more of the problems set forth above and/or other problems in the art.

SUMMARY

A system for remote control of a machine includes a light source configured to emit a light beam; a camera configured to obtain image data of an environment that includes the light beam and an object, wherein the light beam is configured to provide a visual indication of a distance from the machine to the object; and a controller configured to cause the image data to be provided to a remote control device that controls an operation of the machine, wherein the image data is provided to cause the image data to be included in a video feed, of the environment, displayed by the remote control device, wherein control of the operation of the machine, through the remote control device, is based, at least in part, on the light beam displayed in the video feed, and wherein a visual characteristic of the light beam, in the video feed, changes to indicate a change in the distance from the machine to the object.

A machine includes an implement; a light source configured to emit a light beam; a camera configured to obtain image data of an environment that includes the light beam and a target object; a wireless communication component configured to communicate with a remote control device that controls an operation of the machine; and a controller configured to cause the wireless communication component to provide the image data to the remote control device, wherein the image data is provided to cause the image data to be included in a video feed, of the environment, displayed by the remote control device, wherein the light source is configured to cause the light beam, in the video feed, to provide a visual indication of a distance from the machine to the target object, and wherein control of the operation of the machine, through the remote control device, is based, at least in part, on the distance indicated by the light beam displayed in the video feed.

A system includes a light source configured to emit a light beam; a camera configured to obtain image data of an environment that includes the light beam and a target object; and a wireless communication component configured to provide the image data to a remote control device that controls an operation of a machine, wherein the image data is provided to cause the image data to be included in a video feed, of the environment, displayed by the remote control device, and wherein the light source is configured to cause the light beam, in the video feed, to provide a visual indication of a distance from the machine to the target object.

DETAILED DESCRIPTION

Figure 1:
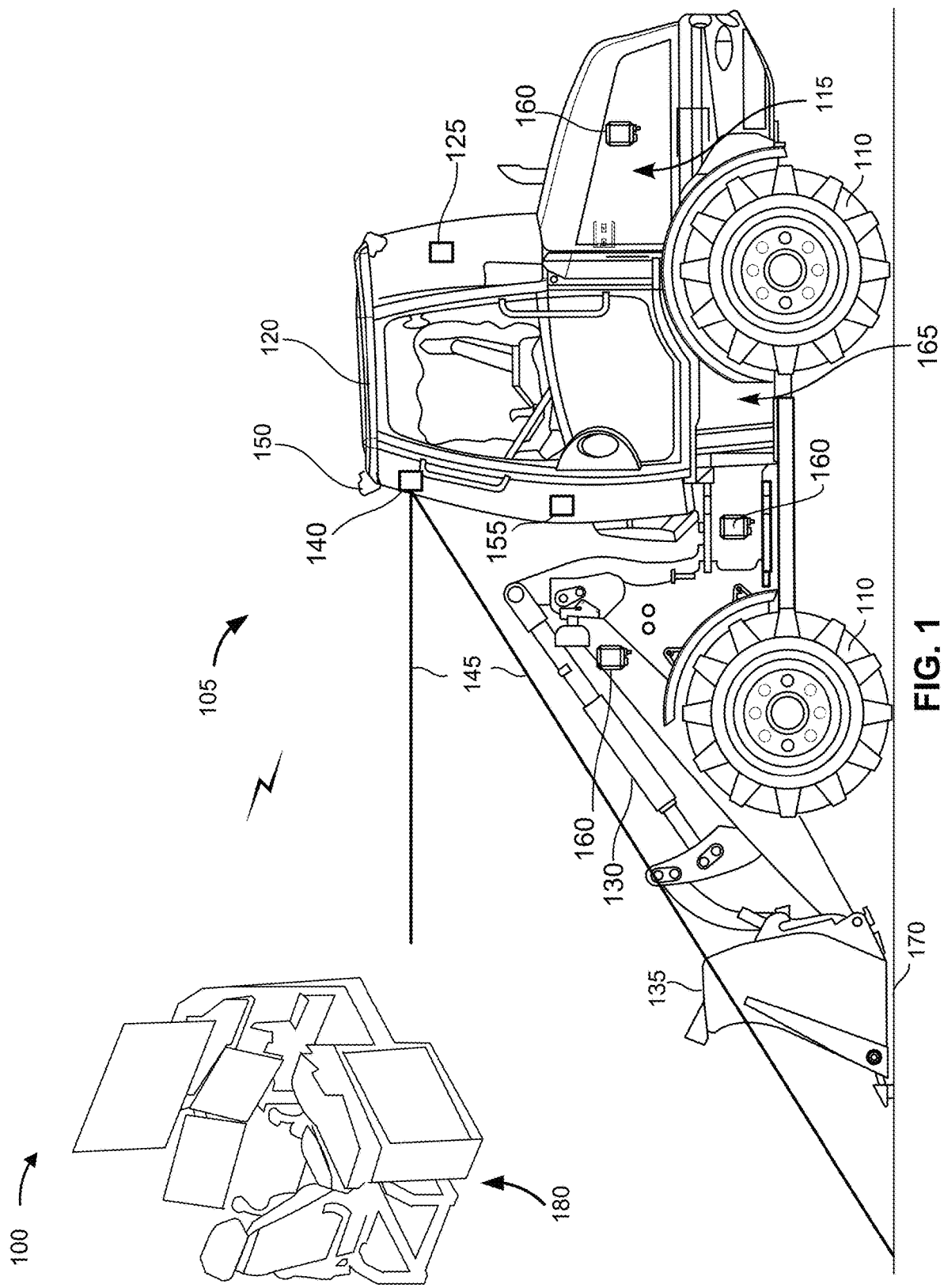
FIG. 1 is a diagram of an example machine described herein.

The present disclosure is directed to a system that uses a light beam to provide depth perception to a remote control device operating a machine. For example, a light source may be mounted to the machine. For instance, the light source may be mounted to an operator cabin of the machine, to a frame of the machine, to existing lighting fixtures of the machine, among other examples. The light source may include a laser light source, an infrared light source, among other examples. The light beam may include a laser light beam, an infrared light beam, among other examples of focused light beam.

The light beam may be projected into an environment surrounding the machine and may provide feedback to an operator of the remote control device when the light beam is distorted by objects provided in a travel path of the machine. For example, the light beam may provide a visual indication of a distance from the machine to an object. For instance, a visual characteristic of the light beam may change to indicate a change in the distance from the machine to the object. The visual characteristic of the light beam may include a shape, a size, a location, among other examples.

In some examples, the light source may be directed toward a ground surface. In this regard, the light source may be configured to cause the light beam to be projected onto the ground surface to indicate that the distance is a first distance from the machine to a target object (e.g., a dump target such as a truck bed of another machine). As the machine approaches the target object, the light beam may be projected onto the target object to indicate that the distance has decreased from the first distance to a second distance.

The light beam may be configured to gradually move vertically upward a side surface of the target object as the machine continues to approach the target object. The light source may be configured to cause the light beam to be projected onto a particular portion of the target object to indicate that the machine is at a target distance, from the target object, for performing a dumping operation. The target distance may be an optimal distance for efficiently and properly performing the dumping operation to dump a load, carried by the machine, onto the target object (e.g., into the truck bed). The machine may continue to approach the target object until the light beam is projected onto the particular portion of the target object.

The target distance may be different for different target objects (e.g., based on different sizes of the target objects, based on different operations associated with the target objects, among other examples). Accordingly, the light source may be configured to cause the light beam to be projected onto different portions of different target objects to indicate different target distances.

The machine may include a camera configured to obtain image data of the environment that includes the light beam and the target object. The image data may be provided to the remote control device to cause the image data to be included in a video feed, of the environment, displayed by the remote control device. The image data, of the light beam in the video feed, may provide a visual indication of the distance. The visual indication may be used by the remote control device to control the machine.

In some instances, the machine may include multiple light sources. Each light source may emit a light beam that is projected into the environment. The multiple light beams may provide visual indications, in the video feed, of the distance from the machine to the target object. In some examples, the multiple light sources may be configured to cause an intersection of the multiple beams to indicate the target distance. In this regard, the machine may approach the target object until the intersection is projected onto a desired portion of the target object.

While examples herein may be directed to a dumping operation, the present disclosure is applicable to other types of operations such as a digging operation, a navigating operation, among other examples. For example, the light source may be configured to provide a visual indication of a target distance, from the machine, for performing the digging operation.

The term "machine" may refer to a device that performs an operation associated with an industry such as, for example, mining, construction, farming, transportation, or another industry. Moreover, one or more implements may be connected to the machine. As an example, a machine may include a construction vehicle, a work vehicle, or a similar vehicle associated with the industries described above.

FIG. 1 is a diagram of an example implementation 100 described herein. As shown in FIG. 1, example implementation 100 includes a machine 105 and a remote control device 180. Machine 105 is embodied as an earth moving machine, such as a wheel loader. Alternatively, machine 105 may be another type of machine, such as an excavator, a dozer, among other examples.

As shown in FIG. 1, machine 105 includes ground engaging members 110, an engine 115, an operator cabin 120, a wireless communication component 125, a stick 130, and a machine work tool 135. Ground engaging members 110 may include wheels (as shown in FIG. 1), tracks, rollers, among other examples, for propelling machine 105. Ground engaging members 110 are mounted on a machine body and are driven by engine 115 and drive trains (not shown). Engine 115 may be operatively connected to provide power to drive at least one of the ground engaging members 110. Operator cabin 120 is supported by the machine body. Operator cabin 120 may include an integrated display (not shown) and operator controls (not shown), such as, for example, an integrated joystick. The operator controls may include one or more input components.

For an autonomous machine, the operator controls may not be designed for use by an operator and, rather, may be designed to operate independently from an operator. In this case, for example, the operator controls may include one or more input components that provide an input signal for use by another component without any operator input.

Wireless communication component 125 may include one or more devices that are capable of communicating with remote control device 180, as described herein. Wireless communication component 125 may include a transceiver, a separate transmitter and receiver, an antenna, among other examples. Wireless communication component 125 may communicate with the one or more machines using a short-range wireless communication protocol such as, for example, BLUETOOTH® Low-Energy, BLUETOOTH®, Wi-Fi, near-field communication (NFC), Z-Wave, ZigBee, or Institute of Electrical and Electronics Engineers (IEEE) 802.154, among other examples.

Additionally, or alternatively, wireless communication component 125 may communicate with remote control device 180, one or more other machines and/or one or more devices via a network that includes one or more wired and/or wireless networks.

Stick 130 is pivotally mounted at its proximal end to the machine body and is articulated relative to the machine body by one or more fluid actuation cylinders (e.g., hydraulic or pneumatic cylinders), electric motors, and/or other electro-mechanical components. Stick 130 may be referred to as a linkage. Machine work tool 135 is mounted at a distal end of stick 130 and may be articulated relative to stick 130 by one or more fluid actuation cylinders, electric motors, and/or other electro-mechanical components. Machine work tool 135 may be a bucket (as shown in FIG. 1) or another type of tool or implement that may be mounted on stick 130. Machine work tool 135 may be referred to as an implement.

Machine 105 may include a light source 140, a light beam 145, a camera 150, a controller 155 (e.g., an electronic control module (ECM), a computer vision controller, an autonomy controller, among other examples), one or more inertial measurement units (IMUs) 160 (referred to herein individually as "IMU 160," and collectively referred to as "IMUs 160"), and a frame 165.

Light source 140 may include a laser light source, an infrared light source, among other examples of devices that emit focused light beams. As shown in FIG. 1, light source 140 may be mounted on operator cabin 120. Alternatively, light source 140 may be mounted on other portions of machine 105, such as the machine body, a frame, a chassis, among other examples.

Light source 140 may be configured to emit light beam 145. In some examples, light source 140 may be configured to cause light beam 145 to be projected onto ground surface 170 (e.g., projected to a front side of machine 105). Additionally, or alternatively, light source 140 may be configured to cause light beam 145 to be projected in a manner that causes light beam 145 to be parallel to ground surface 170. Additionally, or alternatively, light source 140 may be configured to cause light beam 145 to be projected to a lateral side of machine 105. Additionally, or alternatively, light source 140 may be configured to cause light beam 145 to be projected to a rear portion of machine 105.

Light beam 145 may include a laser light beam, an infrared light beam, among other examples of focused light beams. Light beam 145 may be distorted by objects (e.g., target objects) located in a traveling path of machine 105. Light beam 145 may provide an indication of a distance from machine 105 to a target object. For example, a visual characteristic of light beam 145 may change to indicate a distance from machine 105 to a target object and to indicate a change in the distance from machine 105 to the target object. The visual characteristic of light beam 145 may include a shape, a size, a location, among other examples.

With respect the visual characteristic changing, light beam 145 may be a first shape when the distance from machine 105 to the target object is a first distance, a second shape when the distance from machine 105 to the target object is a second distance that is less than the first distance, and so on. Additionally, or alternatively, light beam 145 may be a first size (e.g., a first width) when the distance from machine 105 to the target object is the first distance, a second size (e.g., a second width) that is less than the first size when the distance from machine 105 to the target object is the second distance, and so on.

Additionally, or alternatively, light beam 145 may be projected onto ground surface 170 when the distance from machine 105 to the target object is the first distance, projected onto a bottom portion of the target object when the distance from machine 105 to the target object is the second distance, and so on. The distances and the visual characteristic are merely provided as examples. In practice, other examples may be used for the distances and the visual characteristic.

Camera 150 may include one or more devices that are capable of obtaining and providing image data of an environment (that includes light beam 145 and the target object) surrounding machine 105. The image data may be provided to remote control device 180 to cause the image data to be included in a video feed, of the environment, displayed by remote control device 180.

In some implementations, camera 150 may be a monocular camera and the image data may be two-dimensional (2D) image data. Alternatively, camera 150 may be a stereo camera and the image data may be three-dimensional (3D) image data. In some situations, camera 150 may be configured to detect infrared light beams. For example, infrared filters may be removed from camera 150 to enable camera 150 to detect infrared light beams. In this regard, the image data may include data regarding the infrared light beams detected by camera 150.

Controller 155 may control and/or monitor operations of machine 105. For example, controller 155 may control and/or monitor the operations of machine 105 based on signals from light source 140, light beam 145, signals from camera 150, signals from IMUs 160 and/or signals from remote control device 180. In some examples, controller 155 may cause the image data to be provided to remote control device 180. For example, controller 155 may cause wireless communication component 125 to provide the image data to be provided to remote control device 180 to cause the image data to be included in the video feed of the environment.

As shown in FIG. 1, IMUs 160 are installed at different positions on components or portions of machine 105, such as, for example, stick 130, the machine body, engine 115, among other examples. An IMU 160 includes one or more devices that are capable of receiving, generating, storing, processing, and/or providing signals indicating a position and orientation of a component, of machine 105, on which IMU 160 is installed. For example, IMU 160 may include one or more accelerometers and/or one or more gyroscopes.

The one or more accelerometers and/or the one or more gyroscopes generate and provide signals that can be used to determine a position and orientation of the IMU 160 relative to a frame of reference and, accordingly, a position and orientation of the component. While the example discussed herein refers to IMUs 160, the present disclosure is applicable to using one or more other types of sensor devices that may be used to determine a position and orientation of a component of machine 105.

Remote control device 180 may include one or more devices that are configured to be used for a remote control operation of machine 105 (e.g., a remote control operation without line-of-sight with respect to machine 105). For example, remote control device 180 may include one or more displays, one or more operator controls (similar to the operator controls of machine 105), one or more controllers (similar to controller 155), a wireless communication component (similar to wireless communication component 125), among other examples.

Remote control device 180 may establish a communication with machine 105 via the wireless communication component and may control machine 105 using the wireless communication. Remote control device 180 may display, via the one or more displays, the video feed (including the image data obtained by camera 165). In some examples, remote control device 180 may include one or more input components (e.g., a keyboard, a microphone, joysticks, buttons, pedals, among other examples) that are used to provide input regarding the video feed.

Remote control device 180 may control an operation of machine 105 based on light beam 145 displayed in the video feed. As an example, remote control device 180 may control the implement of machine 105 during a dumping operation involving the target object (e.g., a dump target). The image data may be provided to remote control device 180 to facilitate control of the implement during the dumping operation. Light beam 145, in the video feed, may be configured to provide a visual indication of the distance from machine 105 to the target object. The visual indication of light beam 145 and the change of the visual characteristic of light beam 145 may be used to facilitate control of the implement during the dumping operation.

In some implementations, the visual characteristic, of light beam 145, may be configured to change based on a velocity of machine 105. For example, a rate of change of light beam 145 may be based on the velocity of machine 105. In this regard, the rate of change of light beam 145 may provide an indication of the velocity of machine 105.

As indicated above, FIG. 1 is provided as an example. Other examples may differ from what was described in connection with FIG. 1.

Figure 2:
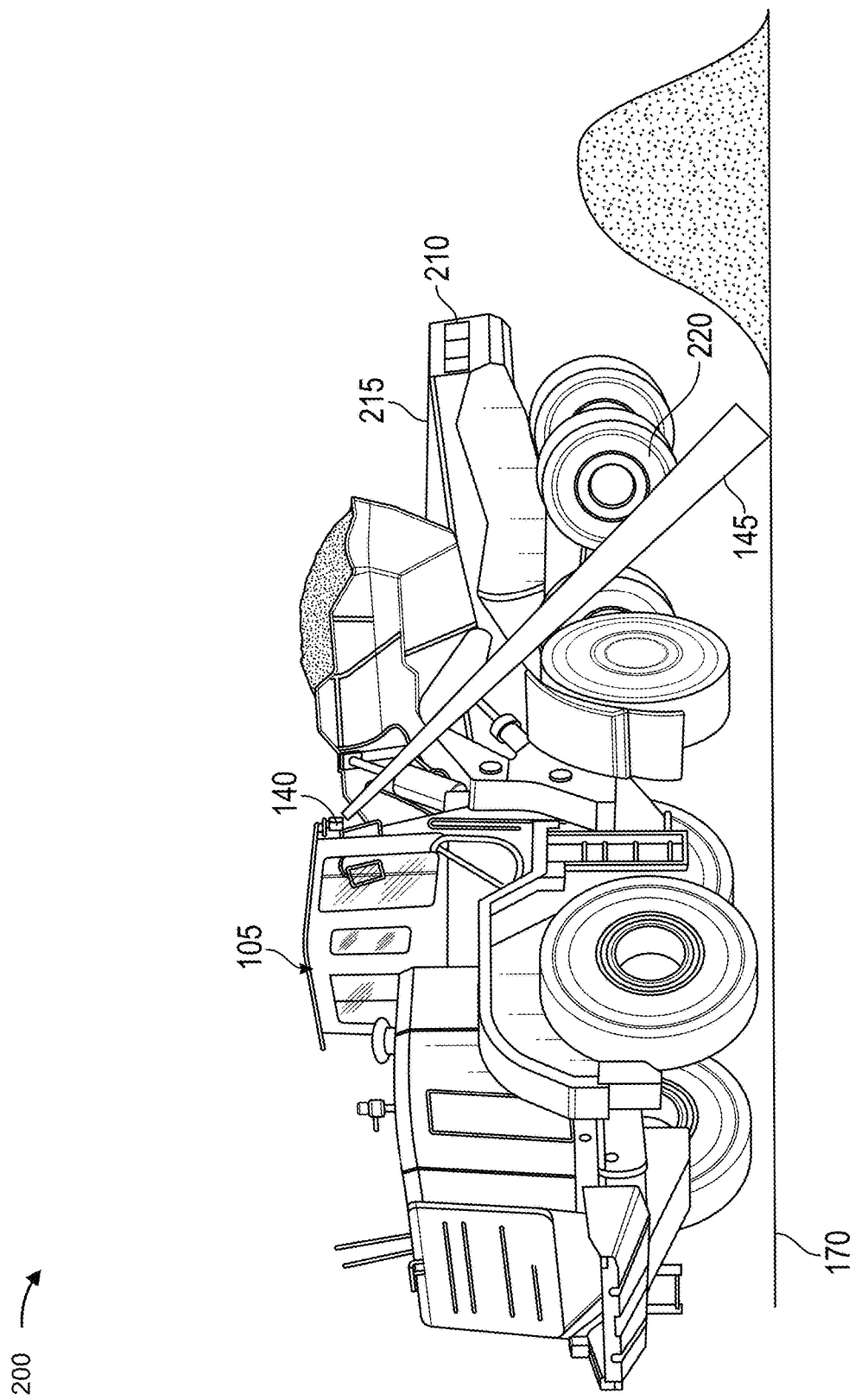
FIG. 2 is a diagram of an example implementation using a light source described herein.

FIG. 2 is a diagram of an example implementation 200 using a light source described herein. As shown in FIG. 2, example implementation 200 may include machine 105 and target object 210. Some of the elements of FIG. 2 have been described above in connection with FIG. 1. Target object 210 may be another machine and/or a portion of the other machine. As shown in FIG. 2, target object 210 may be a truck bed of a dump truck. Target object 210 may include a top portion 215 and a bottom portion 220.

In some implementations, light source 140 may be configured to cause light beam 145 to provide an indication that machine 105 is located at a target distance from the dump target for performing a dumping operation. The target distance may be an optimal distance for efficiently and properly performing the dumping operation to dump a load, carried by the machine, onto target object 210.

As an example, light source 140 may be configured to cause light beam 145 to be projected onto a portion of the dump target (e.g., top portion 215) when machine 105 is located at the target distance. Alternatively, light source 140 may be configured to cause light beam 145 to be projected onto ground surface 170 when machine 105 is located at a distance from target object 210 that exceeds the target distance.

As shown in FIG. 2, light beam 145 is projected onto ground surface 170. Light beam 145 may be projected onto ground surface 170 to indicate that machine 105 is located at a first distance, from target object 210, that exceeds the target distance.

As indicated above, FIG. 2 is provided as an example. Other examples may differ from what was described in connection with FIG. 2.

Figure 3:
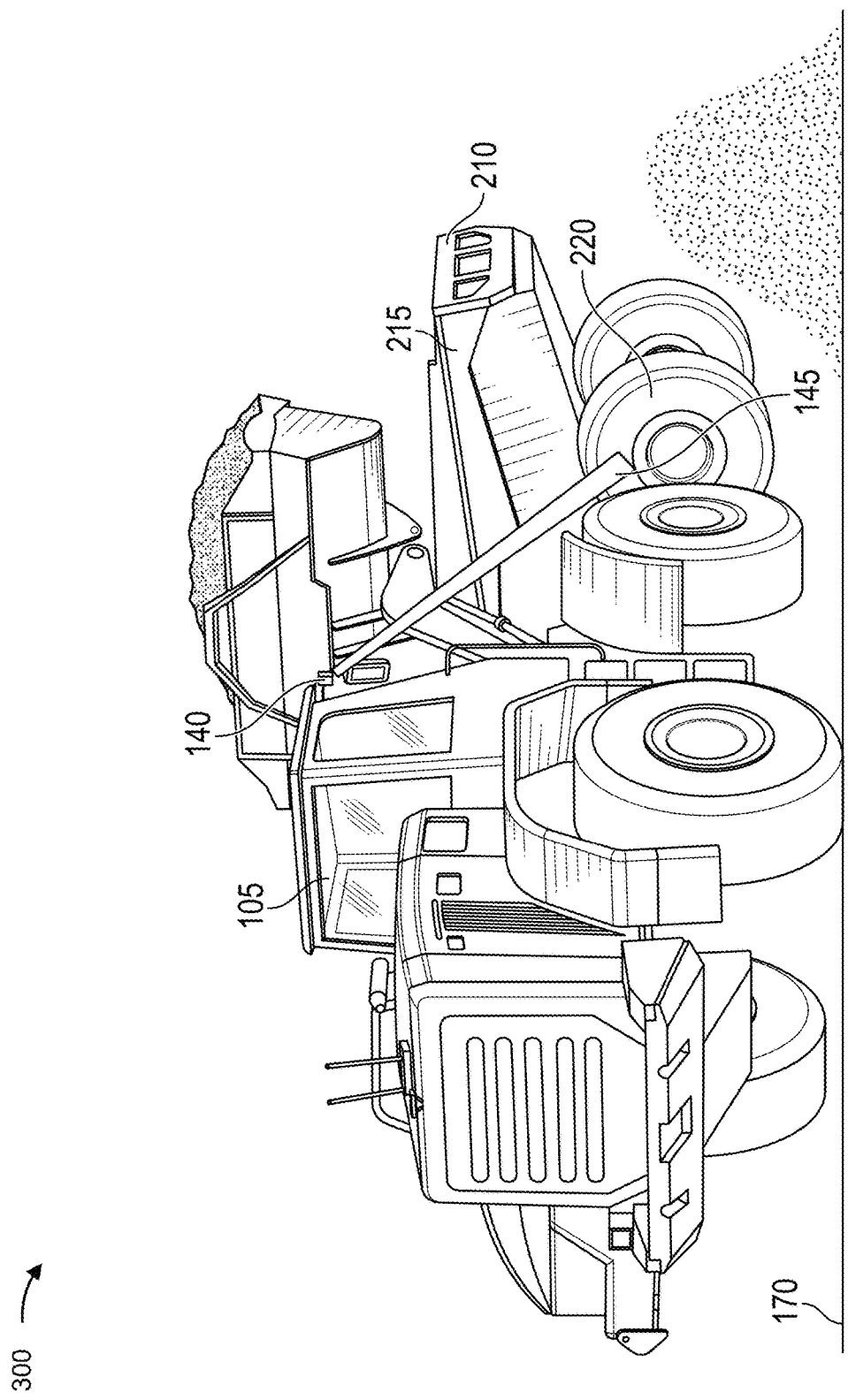
FIG. 3 is a diagram of an example implementation using a light source described herein.

FIG. 3 is a diagram of an example implementation 300 using a light source described herein. As shown in FIG. 3, example implementation 300 may include machine 105 and target object 210. Some of the elements of FIG. 3 have been described above in connection with FIG. 1 and FIG. 2.

As shown in FIG. 3, light beam 145 is projected onto bottom portion 220 of target object 210. Light beam 145 may be projected onto bottom portion 220 to indicate that a distance between machine 105 and target object 210 has decreased from the first distance to a second distance.

As indicated above, FIG. 3 is provided as an example. Other examples may differ from what was described in connection with FIG. 3.

Figure 4:
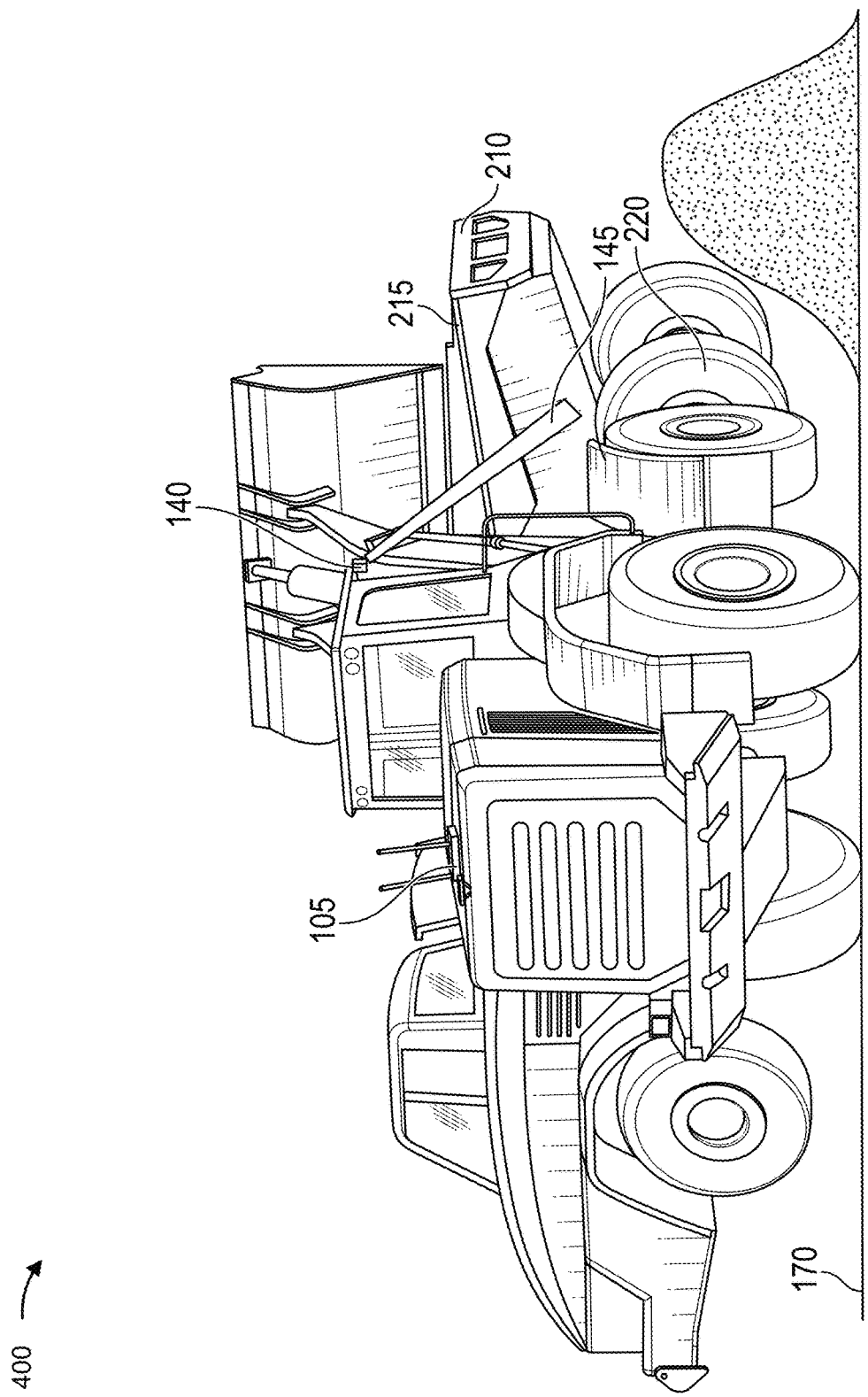
FIG. 4 is a diagram of an example implementation using a light source described herein.

FIG. 4 is a diagram of an example implementation 400 using a light source described herein. As shown in FIG. 4, example implementation 400 may include machine 105 and target object 210. Some of the elements of FIG. 4 have been described above in connection with FIGS. 1-3.

As shown in FIG. 4, light beam 145 is projected onto top portion 215 of target object 210. In this regard, light beam 145 may be configured to gradually move vertically upward a side surface of target object 210 as machine 105 continues to approach target object 210. Light beam 145 may be projected onto top portion 215 to indicate that the distance between machine 105 and target object 210 has decreased from the second distance to a third distance (e.g., the target distance).

As indicated above, FIG. 4 is provided as an example. Other examples may differ from what was described in connection with FIG. 4.

Figure 5:
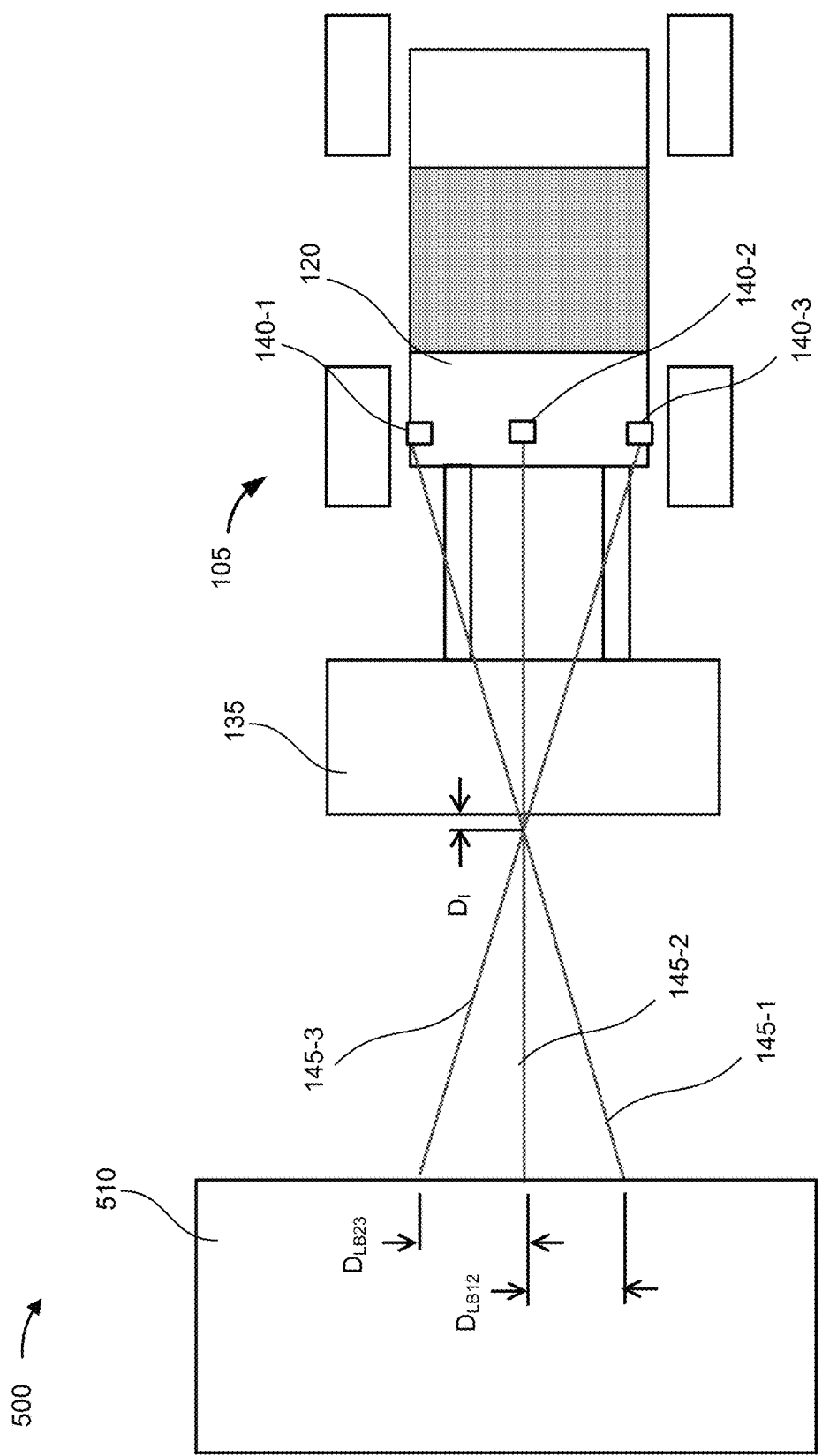
FIG. 5 is a diagram of an example implementation using multiple light sources described herein.

FIG. 5 is a diagram of an example implementation 500 using multiple light sources described herein. As shown in FIG. 5, example implementation 500 may include machine 105 and a target object 510 (e.g., a dump target, such as a truck bed of a dump truck). Machine 105 may include multiple light sources 140, namely first light source 140-1, second light source 140-2, and third light source 140-3. As shown in FIG. 5, light sources 140 may be mounted on operator cabin 120. Second light source 140-2 may be provided between first light source 140-1 and third light source 140-3.

Light sources 140 may emit multiple light beams 145. For example, first light source 140-1 may emit first light beam 145-1, second light source 140-2 may emit second light beam 145-2, and third light source 140-3 may emit third light beam 145-3. Light beams 145 may be parallel to ground surface 170 and may be projected onto a side surface of target object 510.

Light beams 145 may be configured such that distances between light beams 145 indicate whether machine 105 is approaching an object provided in a path that is perpendicular to a travel path of machine 105. For example, light beams 145 may indicate that machine 105 is approaching an object that is provided in a path that is perpendicular to the travel path of machine 105 when a distance $D_{LB12}$ (between first light beam 145-1 and second light beam 145-2) is equal to $D_{LB23}$ (between second light beam 145-2 and third light beam 145-3).

As shown in FIG. 5, distance $D_{LB12}$ is equal to $D_{LB23}$. In this regard, distance $D_{LB12}$ and distance $D_{LB23}$ may indicate (to the operator of remote control device 180) that target object 510 is provided in a path that is perpendicular to the travel path of machine 105.

In some situations, distance $D_{LB12}$ and distance $D_{LB23}$ may be configured to change based on the velocity of machine 105. For example, a rate of change of distance $D_{LB12}$ and distance $D_{LB23}$ may be based on the velocity of machine 105.

In some instances, light sources 140 may be configured to cause an intersection of light beams 145 to indicate a target distance from machine 105. The target distance may be an optimal distance for performing the dumping operation to dump a load, carried by machine 105, onto target object 510. As machine 105 approaches target object 510 and as a distance between machine 105 and target object 510 approaches the target distance, distance $D_{LB12}$ and $D_{LB23}$ may decrease.

The intersection may be projected onto target object 510 to indicate that machine 105 has reached the target distance. Machine 105 may be controlled to initiate the dumping operation when machine 105 reaches the target distance. In some situations, light sources 140 may be configured to cause the intersection to be located at a particular distance Di from a front portion of the implement. The front portion of the implement may be a location of furthest reach for the implement. In this regard, the particular distance Di may be selected to prevent the front portion colliding with target object 510.

As indicated above, FIG. 5 is provided as an example. Other examples may differ from what was described in connection with FIG. 5.

Figure 6:
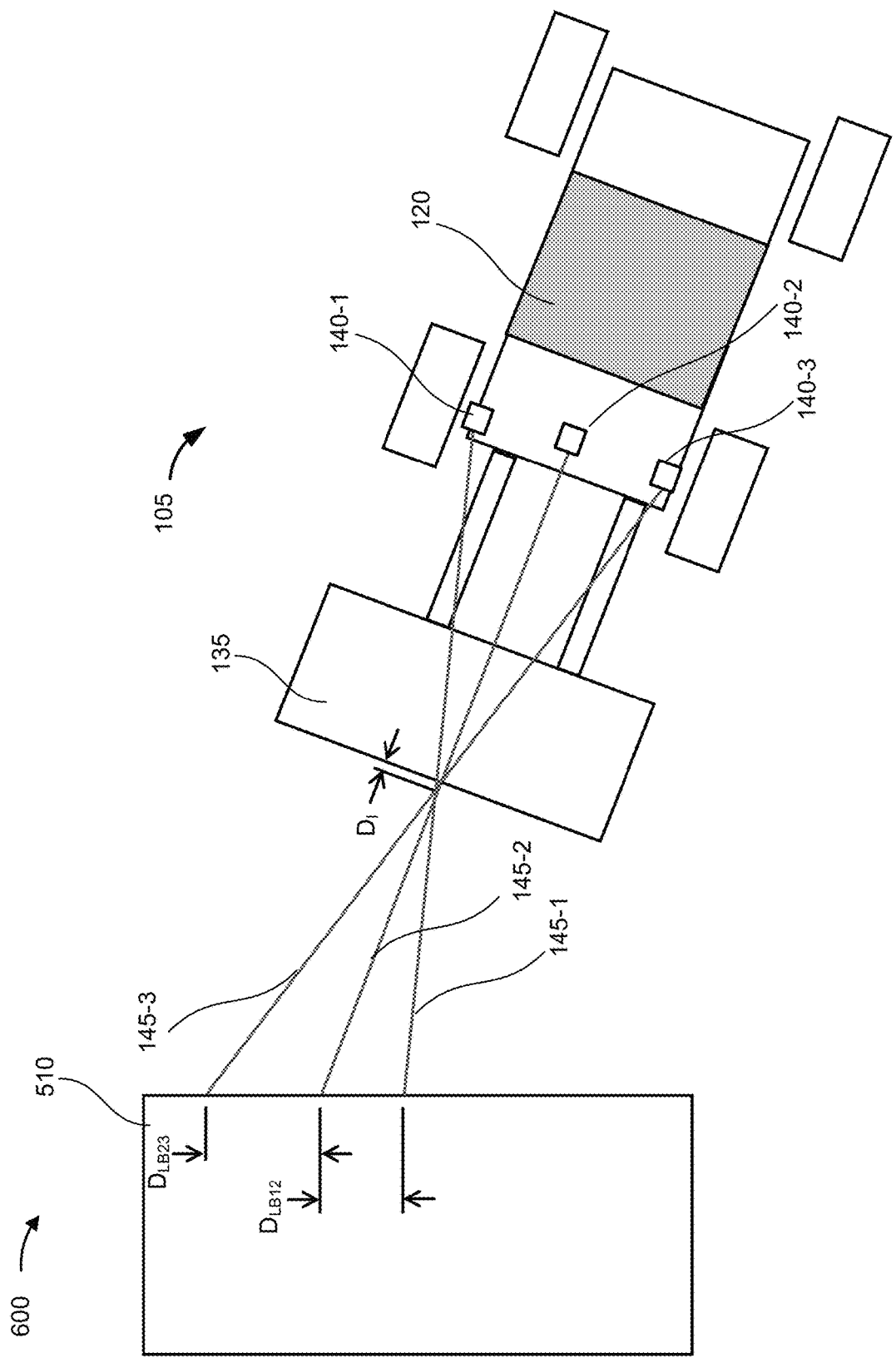
FIG. 6 is a diagram of an example implementation using multiple light sources described herein.

FIG. 6 is a diagram of an example implementation 600 using multiple light sources described herein. As shown in FIG. 6, example implementation 600 may include machine 105 and target object 510. Some of the elements of FIG. 6 have been described above in connection with FIG. 6.

As shown in FIG. 6, distance $D_{LB12}$ is different than $D_{LB23}$. In this regard, distance $D_{LB12}$ and distance $D_{LB23}$ may indicate (to the operator of remote control device 180) that target object 510 is provided in a path that is not perpendicular to the travel path of machine 105.

As indicated above, FIG. 6 is provided as an example. Other examples may differ from what was described in connection with FIG. 6.

INDUSTRIAL APPLICABILITY

The present disclosure is directed to a system that uses a light beam to provide depth perception to a remote control device operating a machine. The light beam may be projected into an environment surrounding the machine and may provide feedback to an operator of the remote control device when the light beam is distorted by objects provided in a travel path of the machine. The light beam may provide an indication of a distance from the machine to an object. For example, a visual characteristic of the light beam may change to indicate a change in the distance from the machine to the object.

An existing machine may include sensor devices that generate sensor data providing a measure of depth perception. An existing remote control device may use the sensor data to control the existing machine based on the depth perception provided by the sensor data. Currently, the sensor devices prematurely experience a failure. The premature failure may cause the existing remote control device to operate the existing machine without depth perception.

By using the light beam to provide depth perception, the system of the present disclosure may enable the remote control device to operate the machine without being subject to premature failures of the sensor devices.

The foregoing disclosure provides illustration and description, but is not intended to be exhaustive or to limit the implementations to the precise forms disclosed. Modifications and variations may be made in light of the above disclosure or may be acquired from practice of the implementations. Furthermore, any of the implementations described herein may be combined unless the foregoing disclosure expressly provides a reason that one or more implementations cannot be combined. Even though particular combinations of features are recited in the claims and/or disclosed in the specification, these combinations are not intended to limit the disclosure of various implementations. Although each dependent claim listed below may directly depend on only one claim, the disclosure of various implementations includes each dependent claim in combination with every other claim in the claim set.

As used herein, "a," "an," and a "set" are intended to include one or more items, and may be used interchangeably with "one or more." Further, as used herein, the article "the" is intended to include one or more items referenced in connection with the article "the" and may be used interchangeably with "the one or more." Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of"). Further, spatially relative terms, such as "below," "lower," "above," "upper," and the like, may be used herein for ease of description to describe one element or feature's relationship to another element(s) or feature(s) as illustrated in the figures. The spatially relative terms are intended to encompass different orientations of the apparatus, device, and/or element in use or operation in addition to the orientation depicted in the figures. The apparatus may be otherwise oriented (rotated 90 degrees or at other orientations) and the spatially relative descriptors used herein may likewise be interpreted accordingly.

What is claimed is:

1. A system for remote control of a machine, the system comprising:
    a light source configured to emit a light beam;
    a camera configured to obtain image data of an environment that includes the light beam and an object,
        wherein the light beam is configured to provide a visual indication of a distance from the machine to the object; and
    a controller configured to cause the image data to be provided to a remote control device that controls an operation of the machine,
        wherein the image data is provided to cause the image data to be included in a video feed, of the environment, displayed by the remote control device,
        wherein control of the operation of the machine, through the remote control device, is based, at least in part, on the light beam displayed in the video feed,
        wherein a visual characteristic of the light beam, in the video feed, changes to indicate a change in the distance from the machine to the object,
        wherein the light source is configured to cause the light beam to be projected onto a ground surface to indicate that the distance is a first distance,
        wherein the light source is configured to cause the light beam to be projected onto a bottom portion of the object to indicate that the distance has decreased from the first distance to a second distance, and
        wherein the light source is configured to cause the light beam to move toward a top portion of the object to indicate that the distance has decreased from the second distance to a third distance.

2. The system of claim 1, wherein the object is a dump target,
    wherein the remote control device controls an implement of the machine during a dumping operation involving the dump target, and
    wherein the image data is provided to the remote control device to facilitate control of the implement during the dumping operation.

3. The system of claim 2, wherein the light source is configured to cause the light beam, in the video feed, to provide an indication that the machine is located at a target distance from the dump target for performing the dumping operation,
    wherein the light source is configured to cause the light beam to be projected onto a portion of the dump target when the machine is located at the target distance, and
    wherein the light source is configured to cause the light beam to be projected onto a ground surface when the machine is located at a distance from the dump target that exceeds the target distance.

4. The system of claim 1, wherein the light source includes a laser light source, and
    wherein the light beam is a laser light beam.

5. The system of claim 1, wherein the light source is a first light source and the light beam is a first light beam,
    wherein the system further comprises a second light source configured to emit a second light beam and a third light source configured to emit a third light beam,
    wherein the environment further comprises the second light beam and the third light beam, and
    wherein the first light beam, the second light beam, and the third light beam are configured to provide visual indications, in the video feed, of the distance from the machine to a second object.

6. The system of claim 5, wherein the first light source, the second light source, and the third light source are configured to cause an intersection of the first light beam, the second light beam, and the third light beam to indicate a target distance from the machine to the second object, and
    wherein the first light beam, the second light beam, and the third light beam are parallel to a ground surface.

7. The system of claim 1, wherein the light source includes an infrared light source,
    wherein the light beam is an infrared light beam, wherein the camera is configured to detect the infrared light beam, and
wherein the image data is augmented to include a visual representation, in the video feed, of the infrared light beam detected by the camera.

8. A machine, comprising:
an implement;
a light source configured to emit a light beam;
a camera configured to obtain image data of an environment that includes the light beam and a target object;
a wireless communication component configured to communicate with a remote control device that controls an operation of the machine; and
a controller configured to cause the wireless communication component to provide the image data to the remote control device,
wherein the image data is provided to cause the image data to be included in a video feed, of the environment, displayed by the remote control device,
wherein the light source is configured to cause the light beam, in the video feed, to provide a visual indication of a distance from the machine to the target object,
wherein control of the operation of the machine, through the remote control device, is based, at least in part, on the distance indicated by the light beam displayed in the video feed,
wherein the light source is configured to cause the light beam to be projected onto a ground surface to indicate that the distance is a first distance,
wherein the light source is configured to cause the light beam to be projected onto a first portion of the target object to indicate that the distance has changed from the first distance to a second distance, and
wherein the light source is configured to cause the light beam to move toward a second portion of the target object to indicate that the distance has changed from the second distance to a third distance.

9. The machine of claim 8, wherein a visual characteristic of the light beam, in the video feed, changes to indicate a change in the distance from the machine to the target object.

10. The machine of claim 9, wherein the visual characteristic of the light beam changes based on a velocity of the machine.

11. The machine of claim 8, wherein the light source includes an infrared light source or a laser light source, and
wherein the light beam is an infrared light beam or a laser light beam.

12. The machine of claim 8, wherein the light source is a first light source,
wherein the light beam is a first light beam,
wherein the machine further comprises a second light source configured to emit a second light beam and a third light source configured to emit a third light beam,
wherein the image data includes image data of the second light beam and the third light beam, and
wherein the first light beam, the second light beam, and the third light beam are configured to provide visual indications, in the video feed, of the distance from the machine to a second target object.

13. The machine of claim 12, wherein the first light beam, the second light beam, and the third light beam are parallel to a ground surface,
wherein the first light beam, the second light beam, and the third light beam are projected onto the second target object,
wherein the second light beam is provided between the first light beam and the third light beam, and
wherein a distance between the first light beam and the second light beam decreases to indicate, in the video feed, that the machine is approaching the second target object.

14. The machine of claim 12, wherein the first light source, the second light source, and the third light source are configured to cause an intersection of the first light beam, the second light beam, and the third light beam to indicate a second target distance from the machine to the second target object, and
wherein the first light source, the second light source, and the third light source are configured to cause the intersection to be located at a particular distance from a front portion of the implement.

15. A system, comprising:
a light source configured to emit a light beam;
a camera configured to obtain image data of an environment that includes the light beam and a target object; and
a wireless communication component configured to provide the image data to a remote control device that controls an operation of a machine,
wherein the image data is provided to cause the image data to be included in a video feed, of the environment, displayed by the remote control device, and
wherein the light source is configured to cause the light beam, in the video feed, to provide a visual indication of a distance from the machine to the target object
wherein the light source is configured to cause the light beam to be projected onto a ground surface to indicate that the distance is a first distance, and
wherein the light source is configured to cause the light beam to be projected onto a first portion of the target object to indicate that the distance has changed from the first distance to a second distance from the machine to the target object.

16. The system of claim 15, wherein a visual characteristic of the light beam, in the video feed, changes to indicate a change in the distance from the machine to the target object, and
wherein the visual characteristic of the light beam changes based on a velocity of the machine.

17. The system of claim 15, wherein the light source is a first light source and the light beam is a first light beam,
wherein the system further comprises a second light source configured to emit a second light beam and a third light source configured to emit a third light beam,
wherein the first light beam, the second light beam, and the third light beam are projected onto a second target object,
wherein the image data includes image data of the second light beam and the third light beam, and
wherein the first light beam, the second light beam, and the third light beam are configured to provide visual indications, in the video feed, of the distance from the machine to the second target object.

18. The system of claim 1, wherein the light beam has at least one of a first size or a first shape when the machine is the first distance from the object, the first size or shape providing the visual indication of the first distance,
wherein the light beam has at least one of a second size or a second shape when the machine is the second distance from the object, the second size or shape providing the visual indication of the second distance.

19. The system of claim 18, wherein the visual characteristic in the video feed that changes to indicate the change from the first distance to the second distance is at least one of a difference between the first and second sizes, or a difference between the first and second shapes.

20. The machine of claim 10, wherein the visual characteristic of the light beam is at least one of a size or shape of the light beam, and wherein the size or shape of the light beam changes based on a velocity of the machine.

* * * * *